United States Patent
Edmiston

(10) Patent No.: US 10,505,757 B2
(45) Date of Patent: Dec. 10, 2019

(54) NETWORK INTERFACE MODULE AND A METHOD OF CHANGING NETWORK CONFIGURATION PARAMETERS WITHIN A NETWORK DEVICE

(71) Applicant: Graham Edmiston, Bridge of Weir (GB)

(72) Inventor: Graham Edmiston, Bridge of Weir (GB)

(73) Assignee: NXP USA, Inc., Austin, TX (US)

( * ) Notice: Subject to any disclaimer, the term of this patent is extended or adjusted under 35 U.S.C. 154(b) by 565 days.

(21) Appl. No.: 14/568,321

(22) Filed: Dec. 12, 2014

(65) Prior Publication Data

US 2016/0173335 A1 Jun. 16, 2016

(51) Int. Cl.
  *H04L 12/40* (2006.01)
  *H04L 12/24* (2006.01)

(52) U.S. Cl.
  CPC .... *H04L 12/40202* (2013.01); *H04L 41/0816* (2013.01); *H04L 2012/40221* (2013.01)

(58) Field of Classification Search
  None
  See application file for complete search history.

(56) References Cited

U.S. PATENT DOCUMENTS

| | | |
|---|---|---|
| 5,493,673 A | 2/1996 | Rindos, III et al. |
| 5,796,939 A | 8/1998 | Berc et al. |
| 5,982,842 A | 11/1999 | Ohtsuka et al. |
| 6,026,460 A | 2/2000 | David et al. |
| 6,211,317 B1 | 4/2001 | Albrecht et al. |
| 6,233,243 B1 | 5/2001 | Ganmukhi et al. |
| 6,556,571 B1 | 4/2003 | Shahrier et al. |
| 6,671,275 B1 | 12/2003 | Wong et al. |

(Continued)

FOREIGN PATENT DOCUMENTS

| | | |
|---|---|---|
| CN | 101304374 A | 11/2008 |
| WO | PCT-2009098542 A1 | 8/2009 |
| WO | WO 2012/143757 A1 * | 10/2012 |

OTHER PUBLICATIONS

Burns, Alan; "Preemptive Priority Based Scheduling: An appropriate Engineering Approach"; University of York, Department of Computer Science; 24 pages (1993).

(Continued)

*Primary Examiner* — Jeffrey M Rutkowski
*Assistant Examiner* — Ning Li

(57) ABSTRACT

The invention relates to network interface module and a method of changing network configuration parameters on-the-fly within a network device. The network interface module comprises: a processor core arranged to execute a set of threads, the set of threads comprising a port servicing thread arranged to service requests received from a network port of the network interface module; and a task scheduling component arranged to schedule the execution of threads by the processor core. The network interface module is arranged to receive an indication that at least one network configuration parameter for the network port is required to be changed, and upon receipt of such an indication to mask the port servicing thread from being executed by the processor core, and enable the at least one network parameter for the network port to be changed whilst the port servicing thread is masked.

20 Claims, 7 Drawing Sheets

(56) References Cited

U.S. PATENT DOCUMENTS

| | | | |
|---|---|---|---|
| 6,728,949 B1 | 4/2004 | Bryant et al. | |
| 6,745,258 B1* | 6/2004 | Pellegrino | G06F 3/0607 |
| | | | 710/107 |
| 6,925,424 B2 | 8/2005 | Jones et al. | |
| 6,928,470 B1 | 8/2005 | Hamlin | |
| 6,952,824 B1* | 10/2005 | Hooper | G06F 9/3851 |
| | | | 718/100 |
| 7,103,683 B2 | 9/2006 | Madukkarumukumana et al. | |
| 7,221,655 B2 | 5/2007 | Luk | |
| 7,328,364 B1* | 2/2008 | Leong | G06F 11/2087 |
| | | | 714/6.22 |
| 7,391,787 B1 | 6/2008 | McCrosky | |
| 7,613,201 B1 | 11/2009 | Yang et al. | |
| 7,653,086 B2 | 1/2010 | Beser | |
| 7,707,281 B2 | 4/2010 | Baretzki | |
| 7,769,015 B2 | 8/2010 | Huang et al. | |
| 7,805,706 B1* | 9/2010 | Ly | G06F 9/5083 |
| | | | 709/221 |
| 7,921,262 B1* | 4/2011 | Dash | G06F 3/0607 |
| | | | 711/154 |
| 7,979,252 B2 | 7/2011 | Horvitz et al. | |
| 8,045,662 B2 | 10/2011 | Zhuang et al. | |
| 8,065,647 B2 | 11/2011 | Stevens | |
| 8,136,124 B2 | 3/2012 | Kosche et al. | |
| 8,155,082 B2 | 4/2012 | Yamaguchi et al. | |
| 8,176,351 B2 | 5/2012 | Castro et al. | |
| 8,276,142 B2 | 9/2012 | Alameldeen et al. | |
| 8,286,139 B2 | 10/2012 | Jones et al. | |
| 8,295,287 B2 | 10/2012 | Chandhoke | |
| 8,358,589 B2 | 1/2013 | Apostol et al. | |
| 8,621,464 B2 | 12/2013 | Dawson et al. | |
| 8,649,354 B2 | 2/2014 | Kenington et al. | |
| 8,762,951 B1 | 6/2014 | Kosche et al. | |
| 8,826,241 B2 | 9/2014 | Wolczko et al. | |
| 8,839,271 B2 | 9/2014 | Jones et al. | |
| 8,843,684 B2 | 9/2014 | Jones et al. | |
| 9,231,858 B1 | 1/2016 | Greifeneder et al. | |
| 9,258,246 B2 | 2/2016 | Edmiston | |
| 9,262,235 B2 | 2/2016 | Tillier | |
| 9,367,321 B2* | 6/2016 | May | G06F 9/3009 |
| 9,612,881 B2 | 4/2017 | Edmiston | |
| 9,843,255 B1 | 12/2017 | Goumballa et al. | |
| 2002/0118692 A1 | 8/2002 | Oberman et al. | |
| 2003/0167348 A1 | 9/2003 | Greenblat | |
| 2003/0172189 A1* | 9/2003 | Greenblat | G06F 15/78 |
| | | | 709/251 |
| 2003/0208521 A1 | 11/2003 | Brenner et al. | |
| 2004/0153700 A1 | 8/2004 | Nixon et al. | |
| 2004/0168078 A1 | 8/2004 | Brodley et al. | |
| 2005/0021936 A1* | 1/2005 | Bailey | G06F 9/5077 |
| | | | 713/100 |
| 2005/0117575 A1 | 6/2005 | Konda | |
| 2005/0240745 A1 | 10/2005 | Iyer et al. | |
| 2005/0251639 A1 | 11/2005 | Vishin et al. | |
| 2005/0270173 A1 | 12/2005 | Boaz | |
| 2006/0114907 A1 | 6/2006 | Wu | |
| 2006/0159103 A1 | 7/2006 | Jain et al. | |
| 2006/0282638 A1* | 12/2006 | Oshima | G06F 3/0622 |
| | | | 711/170 |
| 2007/0174828 A1 | 7/2007 | O'Brien et al. | |
| 2008/0019395 A1 | 1/2008 | Aithal | |
| 2008/0104659 A1 | 5/2008 | West et al. | |
| 2008/0184233 A1 | 7/2008 | Norton et al. | |
| 2008/0186983 A1 | 8/2008 | Dielissen et al. | |
| 2008/0192661 A1 | 8/2008 | Hamamoto et al. | |
| 2008/0201561 A1 | 8/2008 | Bates | |
| 2009/0240895 A1* | 9/2009 | Nyland | G06F 9/3824 |
| | | | 711/149 |
| 2009/0248935 A1 | 10/2009 | Ehrlich et al. | |
| 2010/0046539 A1 | 2/2010 | Frohna et al. | |
| 2010/0083267 A1 | 4/2010 | Adachi et al. | |
| 2010/0125717 A1 | 5/2010 | Navon | |
| 2010/0162265 A1* | 6/2010 | Heddes | G06F 9/542 |
| | | | 719/314 |
| 2010/0205245 A1 | 8/2010 | Le Scouarnec et al. | |
| 2010/0250811 A1 | 9/2010 | Kawashita et al. | |
| 2010/0332698 A1 | 12/2010 | Muller | |
| 2011/0149850 A1 | 6/2011 | Sashihara | |
| 2011/0153822 A1 | 6/2011 | Rajan et al. | |
| 2011/0283262 A1 | 11/2011 | Ceze et al. | |
| 2011/0302336 A1 | 12/2011 | Naylor | |
| 2012/0014489 A1 | 1/2012 | Liu et al. | |
| 2012/0066683 A1 | 3/2012 | Srinath | |
| 2012/0072916 A1* | 3/2012 | Hintermeister | G06F 9/50 |
| | | | 718/102 |
| 2012/0081378 A1* | 4/2012 | Roy | G06T 15/005 |
| | | | 345/522 |
| 2012/0159245 A1* | 6/2012 | Brownlow | G06F 11/0712 |
| | | | 714/23 |
| 2012/0188987 A1 | 7/2012 | Chin et al. | |
| 2012/0290718 A1 | 11/2012 | Nethercutt | |
| 2013/0097384 A1 | 4/2013 | Suzuki et al. | |
| 2013/0275985 A1* | 10/2013 | Lim | G06F 9/466 |
| | | | 718/101 |
| 2014/0006757 A1 | 1/2014 | Assarpour | |
| 2014/0019803 A1 | 1/2014 | Busaba et al. | |
| 2014/0029625 A1 | 1/2014 | Edmiston | |
| 2014/0115374 A1 | 4/2014 | Iyer et al. | |
| 2014/0201556 A1 | 7/2014 | Attar | |
| 2014/0215162 A1 | 7/2014 | Steeley, Jr. et al. | |
| 2014/0344831 A1 | 11/2014 | Levine | |
| 2014/0351825 A1* | 11/2014 | Xu | G06F 9/526 |
| | | | 718/106 |
| 2015/0054836 A1 | 2/2015 | Bolz et al. | |
| 2015/0074668 A1 | 3/2015 | Burka et al. | |
| 2015/0135182 A1* | 5/2015 | Liland | G06F 9/3867 |
| | | | 718/102 |
| 2015/0139653 A1 | 5/2015 | Binkert et al. | |
| 2015/0143343 A1 | 5/2015 | Weiss et al. | |
| 2015/0223198 A1 | 8/2015 | Du et al. | |
| 2015/0324198 A1* | 11/2015 | Alsup | G06F 9/30069 |
| | | | 712/233 |
| 2016/0041933 A1* | 2/2016 | Trojanowski | G06F 13/3625 |
| | | | 710/109 |
| 2016/0173335 A1 | 6/2016 | Edmiston | |
| 2016/0173416 A1 | 6/2016 | Edmiston et al. | |
| 2016/0292017 A1* | 10/2016 | Du | H04L 47/74 |
| 2016/0323141 A1* | 11/2016 | Joshi | H04L 61/1523 |
| 2017/0003972 A1 | 1/2017 | Elliott et al. | |
| 2017/0358329 A1 | 12/2017 | Goumballa et al. | |
| 2018/0024951 A1 | 1/2018 | Edmiston | |

OTHER PUBLICATIONS

Non Final Office Action for U.S. Appl. No. 14/568,298; 23 pages (dated Jun. 29, 2017).

Non Final Office Action for U.S. Appl. No. 15/213,875; 18 pages (dated Feb. 27, 2018).

Notice of Allowance for U.S. Appl. No. 14/568,298; 15 pages (dated Mar. 27, 2018).

U.S. Appl. No. 14/568,298, Edmiston, Graham et al.: "Method and Apparatus for Implementing Deterministic Response Frame Transmission", filed Dec. 12, 2014.

U.S. Appl. No. 15/213,875, Edmiston, Graham: "A Heterogeneous Multi-Processor Device and Method of Enabling Coherent Data Access Within a Heterogeneous Multi-Processor Device", filed Jul. 19, 2016.

Office Action, Final Rejection, U.S. Appl. No. 15/213,875; dated Jul. 16, 2018; 34 Pages.

Notice of Allowance dated Sep. 25, 2018 for U.S. Appl. No. 14/568,298; Graham Edmiston; 23 Pages.

Non-Final Office Action dated Sep. 10, 2019; U.S. Appl. No. 15/213,875; 38 Pages.

Cook, D., "Proving Thread Termination", ACM; PLDI'07, pp. 320-330, 2007.

Malkowski, S., "Challenges and Opportunities in Consolidation at High Resource Utilization: Non-monotonic Response Time Variations in n-Tier Applications", IEEE. Fifth International Conference on Cloud Computing, pp. 162-169, 2012.

(56) References Cited

OTHER PUBLICATIONS

Non-Final office action dated Jun. 3, 2016 in U.S. Appl. No. 14/672,596.
Notice of Allowance dated Dec. 2, 2016 in U.S. Appl. No. 14/672,596.

* cited by examiner

700

| 0x0C0 | dyn_tto | Word | Dynamic tto: Copy value from field to tto_time_bits. |
|---|---|---|---|
| 0x0C4 | dyn_tsl | Word | Dynamic tsl: Copy value from field to tsl_time_bits. |
| 0x0C8 | dyn_tth | Word | Dynamic tth: Copy value from field to tth_time_bits. |
| 0x0CC | dyn_tidl | Word | Dynamic tid1 : Copy value from field to idlet1_time_bits. |
| 0x0D0 | dyn_tsdr | Word | Dynamic tsdr : Copy value from field to min_tsdr_time_bits. |
| 0x0D4 | dyn_auto_baud | Word | Dynamic auto baud: Copy value from field to autobaud_time_bits. |
| 0x0D8 | dyn_baud_control | Word | Dynamic baud control: Copy value from field to baud_control_time_bits. |
| 0x0DC | dyn_dp_control | Word | Dynamic dp control: Copy value from field to dp_control_time_bits. |
| 0x0E0 | dyn_tid2 | Word | Dynamic tid2: Copy value from field to idlet2_time_bits. |
| 0x0E4 | dyn_min_slv_int | Word | Dynamic tid2: Copy value from field to min_slv_int_time_bits. |
| 0x0E8 | dyn_baud_div | Hword | Dynamic baud divider: Copy value from field to baud rate register at address in brg_reg_address. |
| 0x0EA | dyn_hsa | Byte | Dynamic HSA: Copy value from field to HSA parameter. |
| 0x0EB | dyn_ts | Byte | Dynamic TS: Copy value from field to TS parameter. |
| 0x0EC | dyn_gap_init | Byte | Dynamic gap initialisation: Copy value from field to gap_cnt parameters. |
| 0x0ED | dyn_frame_retry | Byte | Dynamic frame retry: Copy value from field to frame_retry_th and frame_retry_cnt parameters. |

FIG. 7

NETWORK INTERFACE MODULE AND A METHOD OF CHANGING NETWORK CONFIGURATION PARAMETERS WITHIN A NETWORK DEVICE

FIELD OF THE INVENTION

This invention relates to a network interface module and a method of changing network configuration parameters within a network device, and in particular to a network interface module and a method of changing network configuration parameters on-the-fly within a network device.

BACKGROUND OF THE INVENTION

In the field of computer network systems, and in particular industrial computer network systems, there are various scenarios where the network parameters within a network device are required to be changed, for example due to another device being added or removed from the network, or when a redundancy switchover between master devices is required to be performed. FIG. 1 schematically illustrates a simplified block diagram of an industrial computer network system 100 comprising two master devices 110, 120. Slave devices 130 within the computer network system 100 of FIG. 1 are arranged in a multi-drop configuration, such as may be implemented within, say, a PROFIBUS (Process Field Bus) computer network. Other network configurations are equally possible, such as, say, a ring configuration as may be used within an Ethernet network, etc.

The first master device 110 is configured to actively control the slave devices 130 within the computer network system 100. The second master device 120 is configured in a redundant capacity, and as such is inactive in terms of controlling the slave devices 130. The redundant master device 120 may still participate in sending some frames on the network 100. For example, in a PROFIBUS network both master devices 110, 120 participate in token passing, but the second (redundant) master device 120 does not have slave devices 130 in its gap list to control. The first (active) master device 110 is connected to the redundant master device 120 via a protocol bus 140 (e.g. implemented by way of Industrial Ethernet, CAN, PROFIBUS etc.) and optionally via a dedicated link 150 for redundancy monitoring. This dedicated link 150 could be Ethernet, PCI or a proprietary interface.

In operation, both master devices 110, 120 are monitoring the bus 140 and their transmitted frame errors. A redundancy monitoring protocol, indicated generally at 160, is active and it decides when to take an active master device, such as the first master device 110 in FIG. 1, off the bus and when to switch an inactive master device, such as the redundant master device 120 in FIG. 1, to an active state. Such a change of state for the redundant master device 120 requires the network/configuration parameters and other data for the master device 120 to be changed.

Upon a master switchover (e.g. upon the active master device 110 being taken off the bus 140 and the redundant master device 120 being switched to an active state) the slave devices 130 should not be aware that they are being controlled by a different master device. However, state of the art systems require that the port of a network device be disabled or taken offline in order to synchronously and atomically switch from one master device to another and change the network/configuration parameters for the master device(s). Disabling or taking a master device offline in this manner results in a slow handover from one master device to another, increasing the risk of errors occurring within the computer network due to the master device being unavailable for a prolonged period of time. To ensure a handover that does not detrimentally impact system wide behaviour when disabling or taking a device offline, this requires complex software that must run to completion, must not be interrupted, must run within a known timeframe and must be guaranteed a certain proportion of CPU cycle bandwidth.

SUMMARY OF THE INVENTION

The present invention provides a network interface module, a network device, a method of changing network configuration parameters on-the-fly within a network device and a method of performing a redundancy handover within a computer network as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 7 schematically illustrates an example of a table of network configuration parameters.

DETAILED DESCRIPTION OF THE PREFERRED EMBODIMENTS

Figure 1:
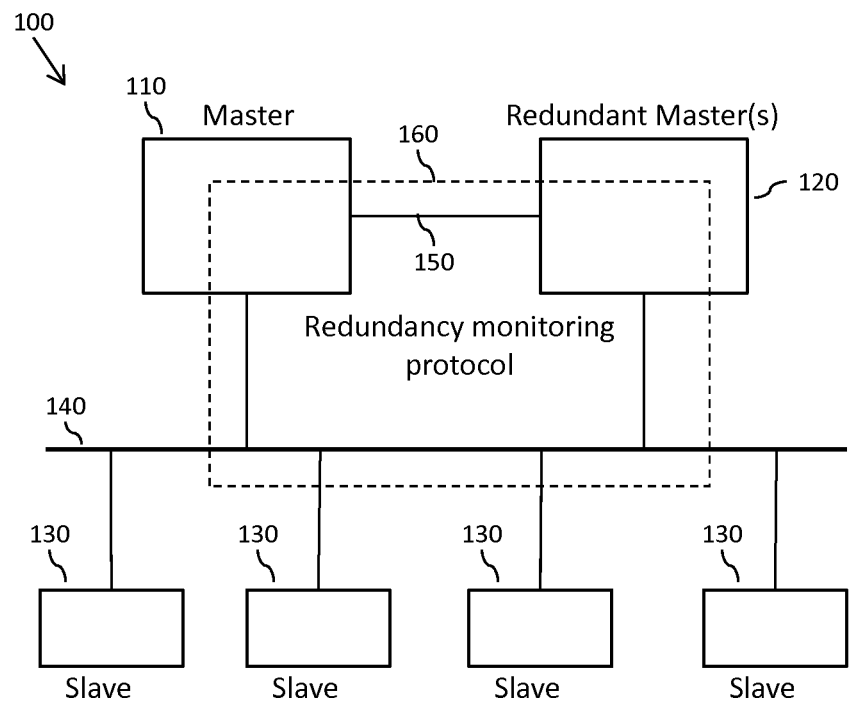
FIG. 1 schematically illustrates a simplified block diagram of an industrial computer network system.

The present invention will now be described with reference to the accompanying drawings in which there are illustrated example embodiments of the present invention. However, it will be appreciated that the present invention is not limited to the specific examples herein described and illustrated in the accompanying drawings.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

According to some aspects of the present invention there is provided a network interface module arranged to transmit and receive data frames over a computer network. The network interface module comprises one or more processor core(s) arranged to execute a set of threads, the set of threads comprising at least one port servicing thread arranged to service requests received from at least one network port of the network interface module. The network interface module further comprises at least one task scheduling component arranged to schedule the execution of threads by the processor core(s). The network interface module is arranged to receive an indication that at least one network configuration parameter for a network port is required to be changed, and upon receipt of such an indication to mask the port servicing thread(s) from being executed by the processor core(s), and to enable the network parameter(s) for the network port to be changed whilst the port servicing thread(s) is/are masked.

In this manner, by masking the port servicing thread(s), the port servicing thread(s) may be prevented from being scheduled for execution by the processor core(s) of the network device. This enables the network configuration parameters to be reconfigured safely, coherently and quickly, and without the port hardware being aware of the network configuration parameters being changed. Once the network configuration parameters have been changed, the port servicing thread(s) may be unmasked and scheduled for execution to service any pending requests from the network port. Thus, network configuration parameters for the network port are able to be changed on-the-fly, dynamically and synchronously, without the need for the network port to be disabled or taken offline. As a result, the network configuration parameters for the network port may be changed in a very fast and efficient manner, thereby negating network perturbations that would otherwise result from the network port being disabled or taken offline, or from leaving a faulty port connected while preparing to switch from the faulty port to a functional port, as required in conventional techniques, and thus mitigating network errors resulting from such perturbations.

Figure 2:
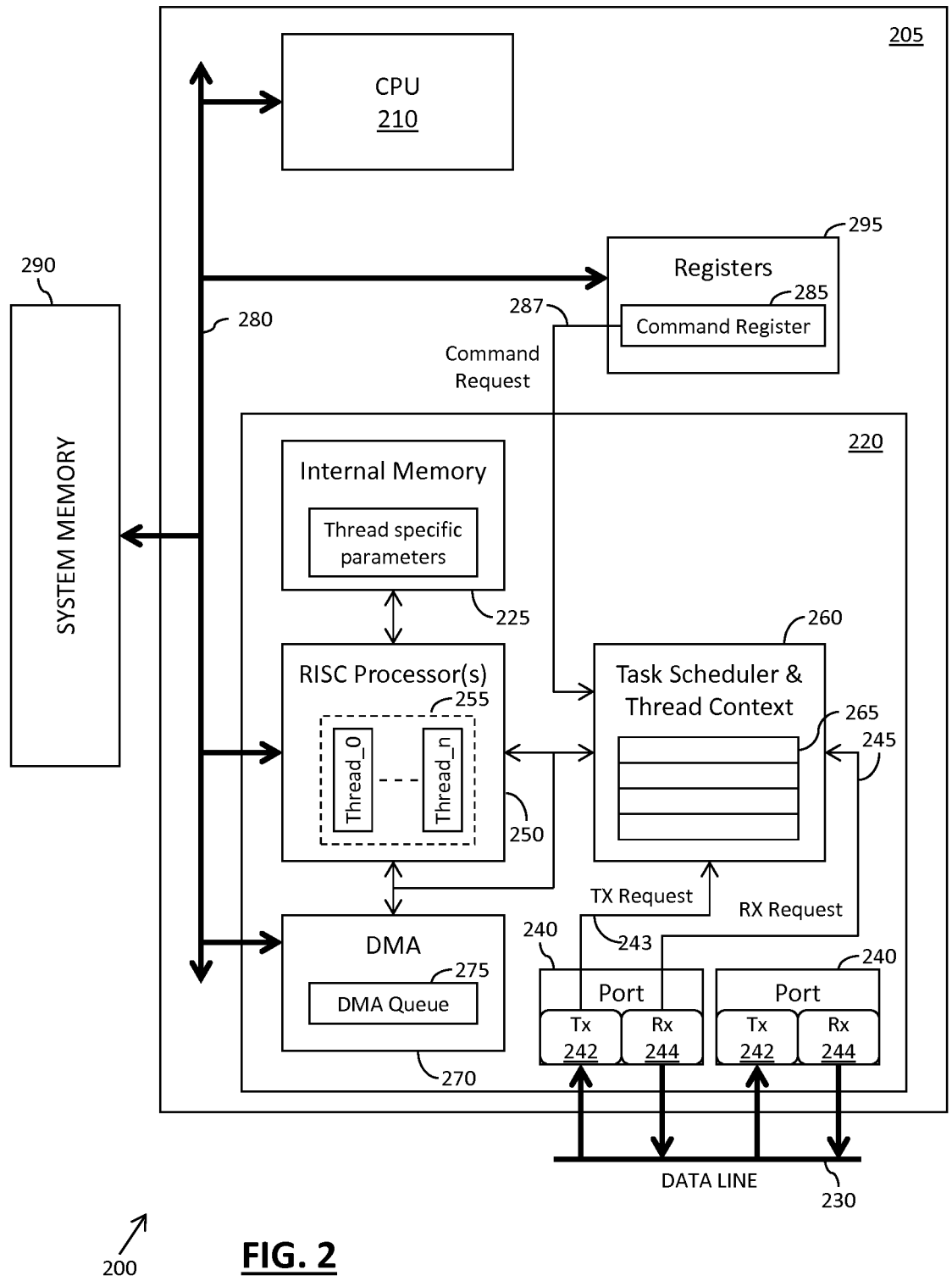
FIG. 2 schematically illustrates a simplified block diagram of an example of network device.

Referring now to FIG. 2, there is schematically illustrated a simplified block diagram of an example network device 200. In the example illustrated in FIG. 2, the network device 200 is implemented within an integrated circuit device 205 comprising at least one die within a single integrated circuit package. The network device 200 comprises one or more application processors arranged to execute application program code for the network device, such as the central processing unit (CPU) 210 illustrated in FIG. 2.

The network device further comprises one or more network interface modules, such as the network interface module 220 illustrated in FIG. 2. The network interface module 220 is arranged to transmit and receive data frames over a computer network 230, such as a PROFIBUS (Process Field Bus) network, Ethernet network, etc. The network interface module 220 comprises one or more ports 240. The, or each, port 240 may comprise, say, a UART (universal asynchronous receiver/transmitter) MAC (media access control) port. The, or each, port 240 comprises separate transmit (Tx) and receive (Rx) hardware 242, 244 comprising separate Tx and Rx buffers (not shown) for data to be transmitted over the computer network 230 and data received over the computer network 230 respectively. The network interface module 220 further comprises at least one processor core, such as the RISC (reduced instruction set computer) processor core 250 illustrated in FIG. 2. The processor core(s) 250 is/are arranged to execute a set of threads, indicated generally at 255. In some examples, the set of threads 255 comprises a Tx thread and an Rx thread for each port 250. A task scheduling component 260 is arranged to control when threads can be executed by the processor core(s) 250, and stores therein thread scheduling and context information 265 for managing the scheduling of the threads 255 and for configuring the processor core(s) 250 to execute the threads 255.

In the illustrated example, the Rx hardware 244 of the, or each, port 240 is arranged to generate an Rx request signal 245 each time a data block is received, indicating that a data block is waiting within the Rx buffer (not shown) for processing. The Rx signal 245 is provided to the task scheduling component 260, and indicates to the task scheduling component 260 that the Rx thread for the port 240 is required to be executed in order to process the data block waiting within the Rx buffer for processing. The Tx hardware 242 of the, or each, port 240 is arranged to generate a Tx request signal 243 when the Tx buffer (not shown) has available capacity. The Tx request signal 243 is provided to the task scheduling component 260, and indicates to the task scheduling component 260 that the Tx buffer has available capacity for receiving a block of data for transmission and that the Tx thread for the port 240 is required to be executed in order to load the next block of data for transmission into the Tx buffer.

In the illustrated example, the network interface module 220 further comprises an internal memory component 225 to which the processor core(s) 250 is/are operably coupled, and a direct memory access (DMA) component 270. The internal memory component 225 contains parameter tables comprising thread specific parameters, for example including network configuration parameters etc. The Tx and Rx threads for the, or each, port 240 may use the same parameter table. This is especially true for industrial protocols where the MAC is tightly coupled regarding many of its Rx and Tx functions. The DMA component 270 comprises a DMA queue 275 containing a list of pending DMAs issued by the threads 255 and provides feedback to the task scheduling component 260 about the DMA state (e.g. complete or still pending) for each thread.

The network device 200 illustrated in FIG. 2 further comprises a hardware command register 285 and an interconnect component 280 for providing communication between the various modules of the network device 200. The interconnection component 280 may comprise, for example, one or more bus components, one or more crossbar switch components, etc. In the illustrated example, the interconnection component 280 of the network device 200 is operably coupled to system memory 290, for example comprising one or more RAM (Random access memory) modules.

Figure 3:
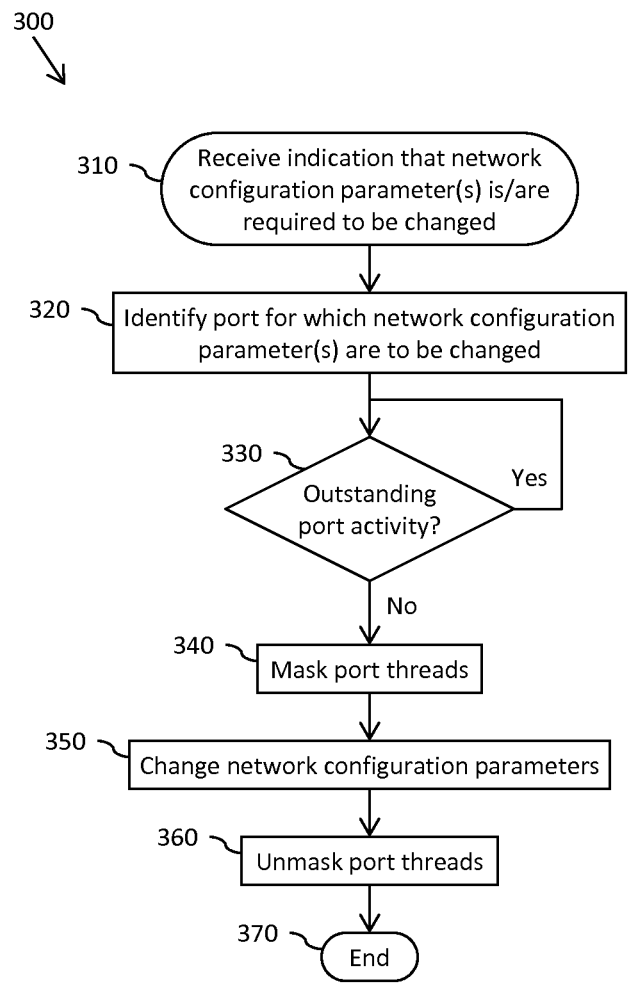
FIG. 3 illustrates a simplified flowchart of an example of a method of changing network configuration parameters on-the-fly within a network device.

Referring now to FIG. 3, there is illustrated a simplified flowchart 300 of an example of a method of changing network configuration parameters on-the-fly within a network device (i.e. without the network device being disabled or taken offline), according to some examples of the present invention. The method starts at 310 with the receipt of an indication that one or more network configuration parameter(s) for a network port is/are required to be changed. Upon receipt of such an indication, the method moves on to 320 where a port of the network device for which network configuration parameters are to be changed is identified. In the illustrated example, the method then waits, at 330, for outstanding activity for the identified port to cease. For example, the method may wait for thread activity associated with the identified port to cease, and for any pending DMAs to complete. Once the outstanding activity for the identified port has ceased, the method moves on to 340 where the thread(s) arranged to service requests from the identified port is/are masked. The network parameters are then changed whilst the thread(s) arranged to service requests from the identified port is/are masked. Once the network parameters have been changed, the thread(s) is/are unmasked, at 360, and the method ends, at 370.

In this manner, by masking the relevant threads for the port 240 to be changed, the threads may be prevented from being scheduled for execution by the processor core(s) 250 of the network device 200, for example in order to service requests received from that port 240. This enables the network configuration parameters to be reconfigured safely, coherently and quickly, and without the port hardware being aware of the network configuration parameters being changed. Once the network configuration parameters have been changed, the thread(s) may be unmasked and scheduled for execution to service any pending requests from the port 240.

Thus, network configuration parameters for the port 240 are able to be changed on-the-fly, dynamically and synchronously, without the need for the port 240 to be disable or taken offline. As a result, the network configuration parameters for the port 240 may be changed in a very fast and efficient manner, thereby negating network perturbations that would otherwise result from the port 240 being disabled or taken offline, or from leaving a faulty port connected while preparing to switch from the faulty port to a functional port, as required in order to change the network configuration parameters in conventional techniques, and thus mitigating network errors resulting from such perturbations.

In the example method illustrated in FIG. 3, the method comprises waiting for outstanding activity for the identified port to cease, at 330. This ensures that the threads associated with the port (i.e. those arranged to service requests from the port) are inactive, and that no bus (DMA) accesses are pending for the port 240 whilst the network configuration parameters therefore are being changed. It will be appreciated that within a network interface module comprising only a single processor core 250 and/or comprising no DMA component 270, it may not be necessary to wait for such outstanding activity to cease.

Figure 4:
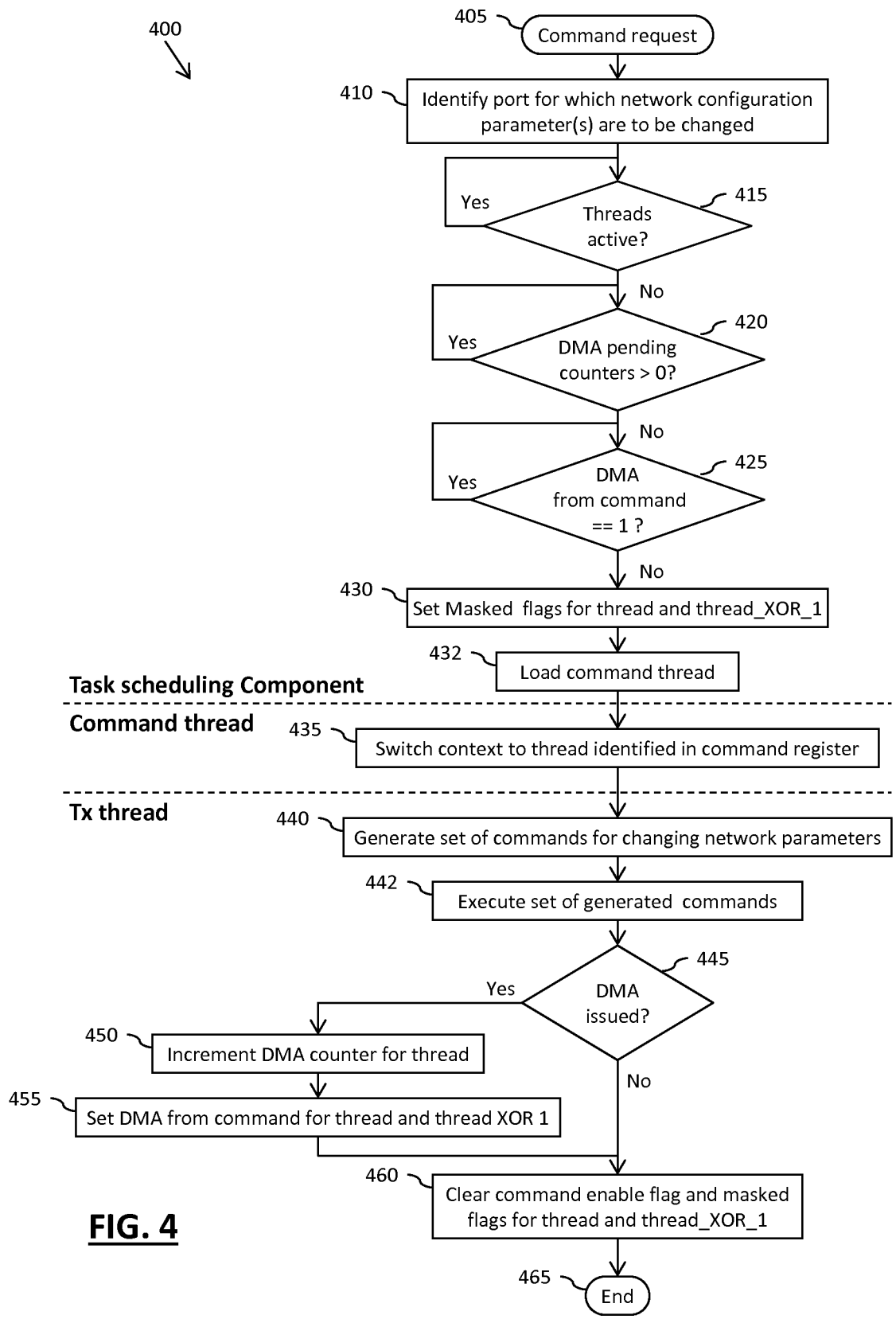
FIG. 4 illustrates a simplified flowchart of an alternative example of a method of changing network configuration parameters on-the-fly within a network device.

Referring now to FIG. 4, there is illustrated a simplified flowchart 400 of an alternative example of a method of changing network configuration parameters on-the-fly within a network device, such as may be implemented within the network device 200 illustrated in FIG. 2.

The method starts at 405 with the receipt of an indication that one or more network configuration parameter(s) for a network port is/are required to be changed. In the illustrated example, the indication that one or more network configuration parameter(s) for a network port is/are required to be changed comprises a command request signal 287 (FIG. 2) received by the task scheduling component 260, for example generated by way of a bit cell 610 (FIG. 6) of the command register 285 being set by the CPU 210 of the network device 200.

Figure 5:
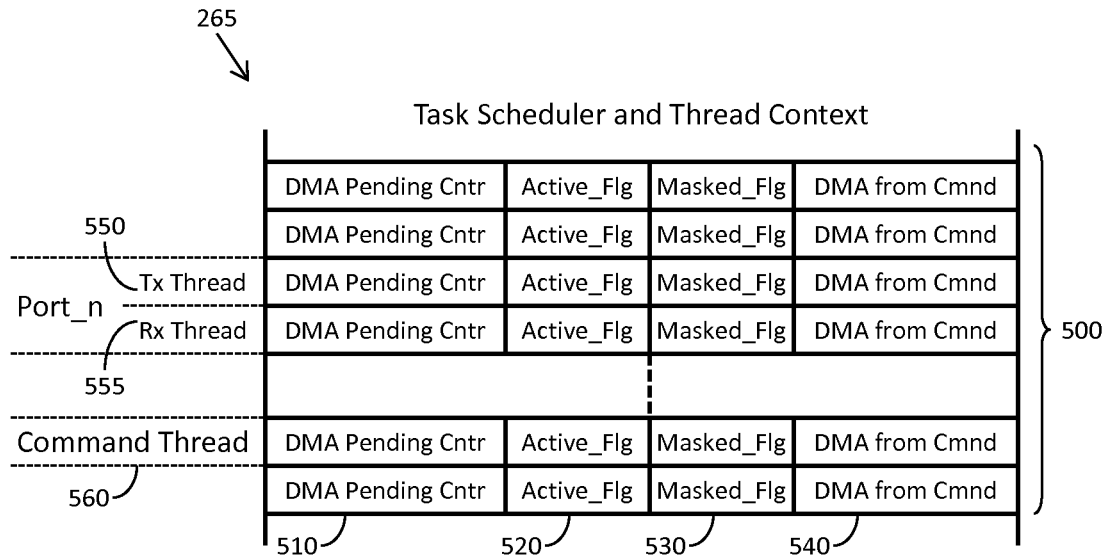
FIG. 5 schematically illustrates a simplified example of thread scheduling and context information for managing the scheduling of threads.

Upon receipt of such an indication, the method moves on to 410 where, a port of the network device for which network configuration parameters are to be changed is identified. For example, and as described in greater detail below, the command register 285 may comprise a thread field 620 (FIG. 6) for identifying one or more threads arranged to service requests received from the network port 240 for which network configuration parameters are required to be changed. In this manner, the task scheduling component 260 may identify the port 240 for which network configuration parameters are to be changed by way of the thread field 620 of the command register 285. The method then waits for outstanding activity for the identified port to cease. FIG. 5 schematically illustrates a simplified example of thread scheduling and context information 265 for managing the scheduling of the threads 255 stored within the task scheduling component 260. The task scheduling component 260 stores thread specific entries 500, each thread entry 500 comprising information corresponding to a specific thread. In the illustrated example, each thread entry 500 comprises the fields:

DMA pending counter 510;
Active flag 520;
Masked flag 530; and
DMA from command flag 540.

The DMA pending counter 510 is incremented for each DMA issued by the associated thread, and decremented when a DMA issued by the associated thread completes. The task scheduler component 260 is prevented from scheduling a thread until the associated DMA pending counter 510 equals zero.

The active flag 520 indicates when the associated thread is currently active (i.e. being executed by the/a processor core 250).

The masked flag 530 is used to mask the associated thread from being scheduled for execution. For example, the task scheduling component 260 may be arranged to set the masked flag 530 to mask the associated thread, and the task scheduling component 260 may be prevented from scheduling a thread for execution by the processor core(s) 250 when the associated masked flag 530 is set.

As described in greater detail below, the DMA from command flag 540 may be used to indicate when a DMA is issued under a command thread 560 is pending.

Referring back to FIG. 4, as previously mentioned the method then waits for outstanding activity for the identified port to cease. In the example illustrated in FIG. 4, the task scheduling component 260 is arranged to wait until threads associated with the identified port 240 are inactive at 415. For example, as mentioned above the set of threads 255 arranged to be executed on the processor core(s) 250 comprises a transmit thread and a receive thread for each port 240, such as the transmit thread 550 and receive thread 555 illustrated in FIG. 5, the transmit thread 550 arranged to service transmit requests received from the respective port 240 and the receive thread 555 arranged to service receive requests received from the respective port 240. Accordingly, the task scheduling component 260 may be arranged to read, or otherwise access, the active flags 520 for the transmit and receive threads 550, 555 for the identified port 240 to determine when both of the transmit and receive threads 550, 555 for the identified port 240 are inactive. Thus, the task scheduling component 260 may determine that the threads associated with the identified port 240 are inactive when both the transmit and receive threads 550, 555 for the identified port 240 are indicated as being inactive by their respective active flags 520.

Figure 6:
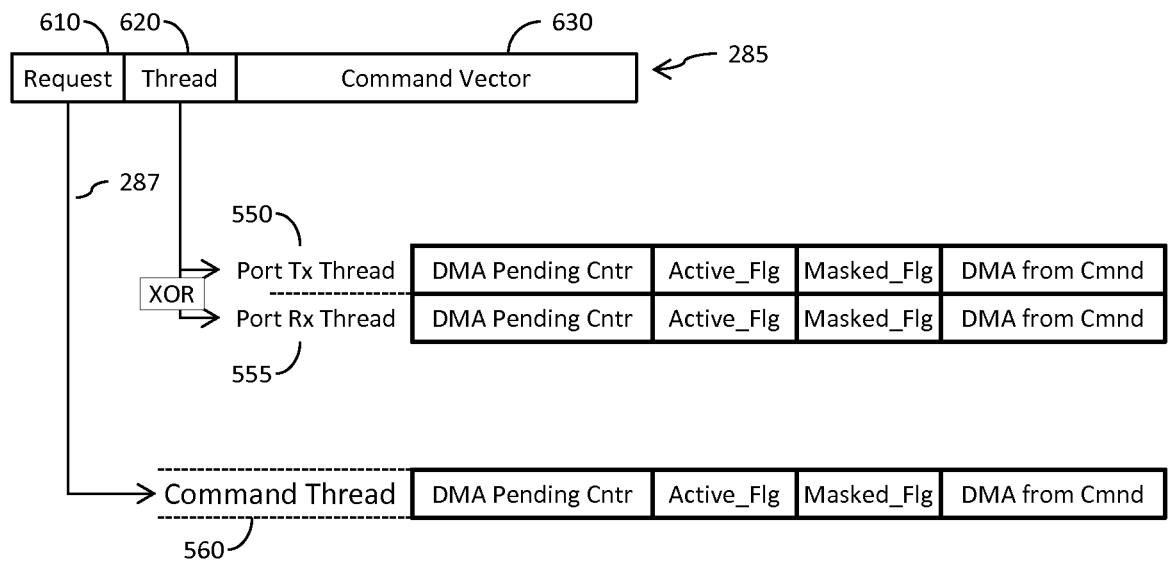
FIG. 6 schematically illustrates a simplified block diagram of a command register.

In some examples, the allocated enumerated identifier for transmit and receive threads 550, 555 for a port 240 may differ by a single bit value, for example such that the transmit thread 550 comprises and even identifier value (e.g. 0x10) and the receive thread 555 comprises the consecutive odd identifier value (e.g. 0x11). In this manner, and as illustrated in FIG. 6, the thread field 620 need only comprise a thread identifier value for one of the transmit and receive threads 550, 555 for a port 240, with both transmit and receive threads 550, 555 for the port 240 being readily derivable therefrom, for example by applying an XOR operation to the value stored within the thread field 620 with the value 0x1. For example, applying an XOR operation to the transmit thread identifier value in the above example of 0x10 with the value 0x1 results in the value 0x11, i.e. the receive thread identifier value in the above example. Conversely, applying an XOR operation to the receive thread identifier value in the above example of 0x11 with the value 0x1 results in the value 0x10, i.e. the transmit thread identifier value in the above example. Thus, the task scheduling component 260 may be arranged to identify the threads associated with the port 240 for which the network configuration parameters are to be changed based on the thread identifier value within the thread field 620, and on the result of applying an XOR operation to the thread identifier value within the thread field 620 with the value 0x1.

In the example illustrated in FIG. 4, the task scheduling component 260 is further arranged to wait until DMAs issued by threads associated with the identified port 240 (e.g. the transmit and receive threads 550, 555 in the illustrated example) have completed, at 420. For example, the task scheduling component 260 may be arranged to read, or otherwise access, the DMA pending counters 510 for the transmit and receive threads 550, 555 for the identified port 240 to determine whether any DMAs issued by the transmit and receive threads 550, 555 are still pending. The task scheduling component 260 may thus be arranged to wait until the number of pending DMAs for the each of the transmit and receive threads 550, 555 is equal to zero before proceeding.

In the example illustrated in FIG. 4, the task scheduling component 260 is further arranged to wait until DMAs previously issued by the command thread in relation to the identified port 240 have completed, at 425. For example, the task scheduling component 260 may be arranged to read, or otherwise access, the DMA from command flags 540 for at least one of the transmit and receive threads 550, 555 for the identified port 240 to determine whether a DMA previously issued by the command thread is still pending. The task scheduling component 260 may thus be arranged to wait until pending DMAs previously issued by the command thread in relation to the identified port 240 have completed.

In the example method illustrated in FIG. 4, once the outstanding activity for the identified port has ceased, the method moves on to 430 where the threads associated with the identified port are masked. For example, the task scheduling component 260 may be arranged to set the masked flags 530 for the transmit and receive threads 550, 555 for the identified ports (e.g. for the thread corresponding to the thread identifier value within the thread field 620, and the thread corresponding to the result of applying an XOR operation to the thread identifier value within the thread field 620 with the value 0x1). In this manner, by waiting for outstanding activity for the identified port to cease and masking the relevant threads for the port 240, the threads may be prevented from being scheduled for execution by the processor core(s) 250 of the network device 200, for example in order to service requests received from that port 240, ensures that the threads associated with the port (i.e. those arranged to service requests from the port) are inactive, and that no bus (DMA) accesses are pending for the port 240 whilst the network configuration parameters therefore are being changed. This enables the network configuration parameters to be reconfigured safely and quickly, and without the port hardware being aware of the network configuration parameters being changed. In the example illustrated in FIG. 4, the task scheduling component 260 is arranged to wait until any outstanding activity for the identified port has ceased before masking the threads associated with the identified port. However, it is contemplated that the threads associated with the identified port may equally be masked first, before waiting for the outstanding activity for the identified port to cease.

Having waited for the outstanding activity for the identified port to cease and masked the threads associated with the identified ports, the method illustrated in FIG. 4 moves on to 432, where in the illustrated example a command thread 560 (FIG. 5) is then loaded for execution by a processor core of the network device, the command thread 560 being arranged to implement the change of network configuration parameters, and in particular for the illustrated example to implement the subsequent steps of the method illustrated in FIG. 4. The task scheduling component 260 may be arranged to include within the context loaded for the command thread 560 information contained within the command register 285, for example the information within the thread field 620 (FIG. 6) identifying one or more threads arranged to service requests received from the network port 240, etc.

The command thread 560 is arranged to switch context to the thread identified in the thread field 620 of the command register 285, which in the illustrated example comprises the transmit thread 550, at 435. For example, the command thread 560 may be able to retrieve context information for the identified thread (e.g. the transmit thread 550) from the task scheduling component 260 and to load the context information into the processing core 250 to cause the processing core to switch to executing the identified thread. In some examples, the command thread 560 may be arranged to force the task scheduling component 260 to switch contexts from the command thread to the identified thread, overriding the masking of the identified thread. Switching context to the identified thread associated with the port 240 for which network configuration parameters are to be changed in this manner, facilitates the changing of the network configuration parameters for the port, since the identified thread (e.g. the transmit thread 550, or equally the receive thread 555) have access to, and are familiar with, the location of the relevant network configuration parameters within memory 225.

Once the context switch to, in the illustrated example, the transmit thread 550 has been performed, the transmit thread 550 proceeds with implementing the changes to the network configuration parameters. In the illustrated example, the transmit thread 550 is arranged to implement such changes by generating a set of commands for changing the network parameters at 440. For example, the command register 285 may further comprise a command vector field 630 (FIG. 6) for storing one or more command vectors from which a set of commands for changing network configuration parameter is able to be generated. The transmit thread 550 may thus obtain the command vector(s) from the command register 285 (as provided by the task scheduling component 260 when the context for the command thread 560 was loaded for execution or as subsequently accessed by the command thread 560 itself) to generate a set of commands for changing the network parameters.

FIG. 7 schematically illustrates an example of a table of network configuration parameters. The table 700 illustrated in FIG. 7 comprises an example of PROFIBUS network configuration parameters on-the-fly. The command vector field 630 may have a command vector stored therein comprising values for each of the table entries, and from which the command thread 560 is able to generate the set of commands for changing the configuration parameters. In some examples, vector values corresponding to entries for parameters that are not required to be changed may be configured to comprise, say, all '1' values to indicate that those entries are to be ignored. The transmit thread 550 is then able to parse the command vector, ignoring entries comprising all '1' values, and generate a set of commands for changing those network configuration parameters for which the table entries do not comprise all '1' values. The transmit thread 550 then executes the set of generated commands, at 442, to change the network configuration parameters. The command thread 560 may use one command corresponding to one vector that is used for changing a plurality or all of the network configuration parameters.

Advantageously, generating and executing the set of commands in the manner, whilst the transmit and receive threads 550, 555 are 'inert' (i.e. masked from being scheduled and all other outstanding activity for the port has ceased) enables all required parameter changes to be implemented in a single operation, avoiding the need for multiple parameter changes to be synchronised or issued in a specific order.

If one or more of the generated commands issues a DMA to update a parameter stored in system memory 290 or within a register, indicated generally at 295, for example a timer or baud rate register, or within any other addressable memory element, the task scheduling component 260 will increment the DMA pending counter 510 for, in the illustrated example, the transmit thread 550 from which the DMA was issued. In this manner, subsequent scheduling of the transmit thread 550 will be prevented until the issued DMA has completed. Accordingly, in the example illustrated in FIG. 4, if a DMA is issued by one of the network configuration parameter changing commands executed by the transmit thread 550, the transmit thread 550 increments its DMA pending counter 510 within the task scheduling component 260, at 450.

However, where separate receive and transmit threads are used to service requests from a network port 240, such as in the illustrated example, such parameters are also accessible by the receive thread 555 for the same port 240. Accordingly, scheduling of the receive thread 555 for the same port 240 must also be prevented until the issued DMA has completed. Accordingly, in the illustrated example the transmit thread 550 is further arranged, upon a DMA being issued by one of the network configuration parameter changing commands executed by the transmit thread 550, to set the DMA from command flag 540 for the transmit and receive threads 550, 555 for the identified ports (e.g. for the thread corresponding to the thread identifier value within the thread field 620, and the thread corresponding to the result of applying an XOR operation to the thread identifier value within the thread field 620 with the value 0x1). The task scheduling component 260 will thus be prevented from subsequently scheduling either the transmit thread 550 or the receive thread 555 whilst their DMA from command flags 540 are set. The task scheduling component 260 will clear the DMA from command flags 540 for the transmit thread 550 or the receive thread 555 once the DMA pending counter 510 for, in the illustrated example, the transmit thread 550 is decremented to zero.

Once the transmit thread 550 has completed executing the set of commands for changing the network configuration parameters, the transmit thread 550 clears the command request flag 610 within the command register to indicate to, say, the CPU 210 that the changing of the network configuration parameters has been completed, and the masked flags 530 for the transmit and receive threads 550, 555 for the identified ports (e.g. for the thread corresponding to the thread identifier value within the thread field 620, and the thread corresponding to the result of applying an XOR operation to the thread identifier value within the thread field 620 with the value 0x1). The method then ends, at 465.

Referring back to FIG. 2, in the illustrated example the CPU 210 is operably coupled to the command register 285 and capable of writing to the command request bit cell 610, the thread field 620, and the command vector field 630. In this manner, application program code executing on the CPU 210 is able to enable the changing of the network configuration parameters by writing to the command register 285. Note that after the commands for changing the network configuration parameters have been completed, and the command request flag 610 has been cleared, the new command thread 560 may be masked by the task scheduling component 260 until all pending DMAs issued by the previous command have completed. Also, if no DMAs were pending and the task scheduling component 260 scheduled any of the port's threads 550, 555 before a new command is issued within the command register 285, then the new command will not start until all thread activity for the thread and thread XOR1 have ceased. Notably, it is contemplated that in some examples the task scheduling component 260 will not allow a thread routine for the port to start if any of the following are true:

The thread 550, 555 is currently running on a processing core, (i.e. masked flag=1)

There are DMAs pending for this thread (i.e. DMA pending counter>0)

There is a command issued for the thread or thread XOR 1, (i.e. 610=1 and field 620 comprises the thread or the thread XOR 1)

DMA from command is set and thread or thread XOR 1 DMA pending counter>0

In addition, the task scheduling component 260 may be arranged to not allow the command thread to start under the following circumstances:

The command thread 560 is currently running on a processing core, (i.e. masked flag=1)

There are DMAs pending for the command thread 560 (DMA pending counter>0)

DMA from command is set and thread 550 or thread XOR 1 555 DMA pending counter>0

In this manner, the task scheduling component 260 waits for all activity to cease on thread and thread XOR 1 after the command request flag 610 is set. Therefore when the command routine is started by the task scheduling component 260 it is certain that the relevant thread(s), 620 and 620 XOR 1, is/are inert and any artefacts of previous thread activity (e.g. DMAs) cannot cause any unintended side effects.

Thus, the invention provides a method and apparatus for changing network configuration parameters on-the-fly within a network device, in which hardware (e.g. the task scheduling component 160) is used to mask threads that service port requests, allowing a command to be executed to change the configuration of a device, for example when a redundant master device assumes fieldbus control. After a command to change the network configuration parameters has been issued, the hardware will mask the threads, wait for bus activity (e.g. issued DMAs) to cease on the threads and wait for any routine currently being processed for the thread to finish.

Accordingly, the invention provides a dynamic, synchronous and atomic operation for changing/updating network configuration parameters on-the-fly, that negates bus perturbations that would otherwise be present when disabling or taking offline a network device port to change such parameters. Significantly, the present invention achieves such on-the-fly parameter changes without requiring dedicated hardware for each parameter. It does this by thread state management and coupling of the DMAs issued by the host command through the use of the DMA from command flags 540.

It is contemplated that the method herein described may be used in various scenarios, for example such as the following cases:
1. to change the bus parameters of a master device following the addition or removal of one or more slave devices; and
2. In a redundant system to dynamically switch the slaves' control (poll cycle) from one master device to another master device In both these cases this can be achieved without disabling the network port of the master device, yielding a very fast, efficient and error mitigating change of parameters. The network port of the master device is able to remain enabled during the operation, while bus parameters are atomically changed to the new values. When the operation completes, the protocol controller (executing on the master device) can continue from its state prior to the command being executed. Thus frame transmission and reception and protocol state machines/timers can proceed uninterrupted directly after command completion. In the redundant handover case the master that assumes bus ownership can be programmed with the same bus parameters (including station address) as the relinquisher. Resultantly the poll cycle can switch from relinquisher to new bus owner while experiencing either a zero or one poll cycle perturbation.

In the examples herein before described and illustrated in the accompanying drawings, masking of the transmit and receive threads 550, 555 for a network port 240 has been described and illustrated as being implemented by way of a masked flag 530 for the respective thread. However, it will be appreciated that any other masking mechanism may equally be implemented. For example, the transmit and receive threads 550, 555 may be masked from being scheduled for execution by masking or gating the transmit and receive request signals 243, 245 from the network port.

Figure 8:
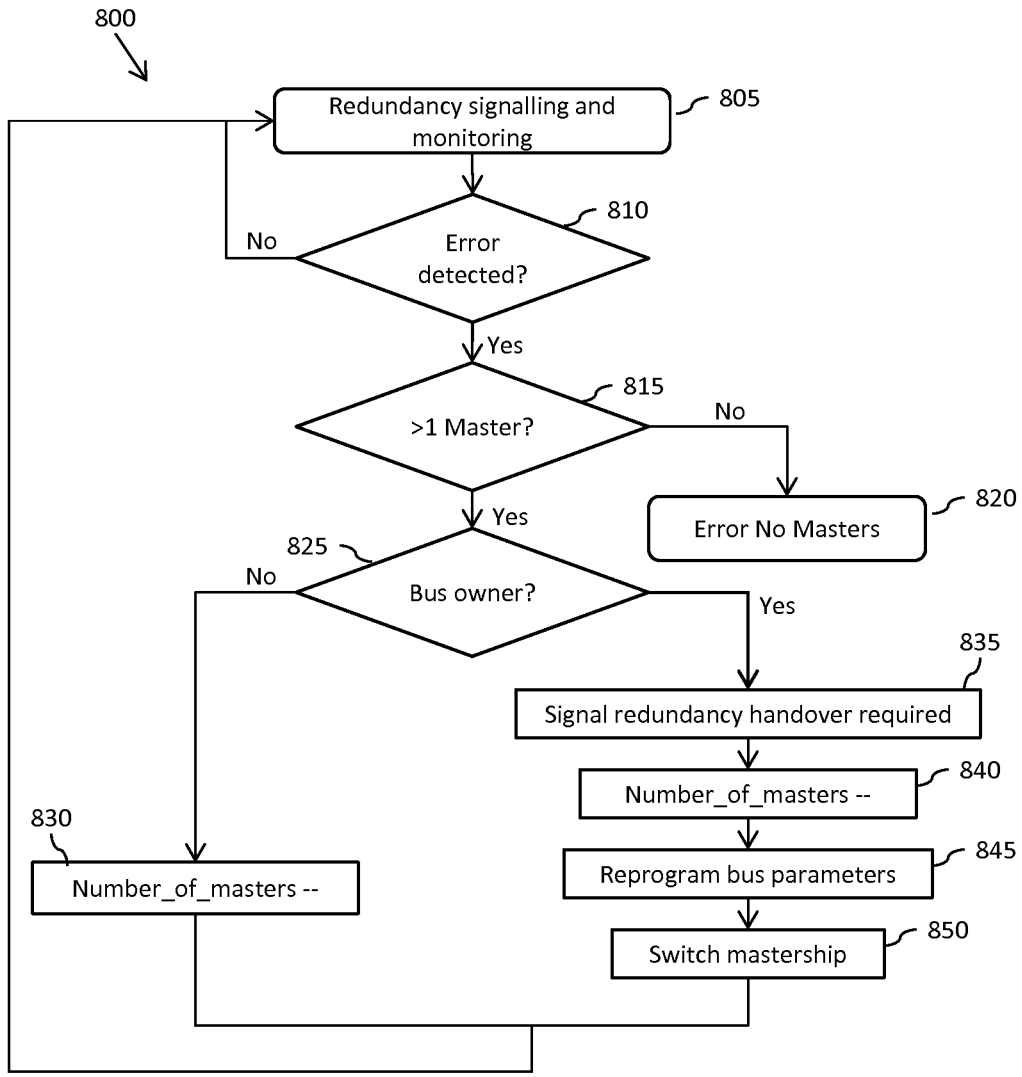
FIG. 8 illustrates a simplified flowchart of one example scenario where network configuration parameters within a network device may be required to be changed.

Referring now to FIG. 8, there is illustrated a simplified flowchart 800 of one example scenario where network configuration parameters within a network device may be required to be changed, and in particular in which changing network configuration parameters on-the-fly would be extremely beneficial, as opposed to conventionally requiring the network device (or a port thereof) to be disabled or taken offline. Specifically, FIG. 8 illustrates a simplified flowchart 800 of an example of a method of performing a redundancy handover within a computer network, such as the computer network 100 illustrated in FIG. 1. The method starts at 805, with the activation of a redundancy monitoring protocol, such as the redundancy monitoring protocol 160 illustrated in FIG. 1. The redundancy monitoring protocol continuously monitors for errors occurring within master devices, and upon detection of such an error at 810 moves on to 815, where it is determined whether the number of master devices is greater than 1. If the number of master devices is not greater than 1, meaning that the detected error has occurred within the only master device, an error is generated at 820 indicating that no (error free) master devices are available. However, if the number of master devices is greater than 1, the method moves on to 825 where it is determined whether the detected error is within the bus owner, for example the first master device 110 configured to actively control the slave devices 130 within the computer network system 100 illustrated in FIG. 1. If the detected error is not within the bus owner, the method moves on to 830 where the number of available master devices is decremented. The method then returns to 805, where the redundancy monitoring protocol is resumed. Conversely, if it is determined that the detected error is within the bus owner at 825, the method moves on to 835 where the need for a redundancy handover is signalled. The number of available master devices is decremented, at 840. Bus parameters, and other network configuration parameters, are then reprogrammed (e.g. changed within a redundant master device at 845, such as the second master device 120 configured in a redundant capacity in the computer network system 100 illustrated in FIG. 1. Such reprogramming of the bus parameters may be performed as herein before described with reference to FIGS. 2 to 7 within a network interface module of the redundant master device. Control of the system bus may then be switched from the faulty master device to the reprogrammed redundant master device, at 850. The method then returns to 805, where the redundancy monitoring protocol is resumed.

Advantageously, reprogramming the bus parameters on-the-fly as hereinbefore described allows the redundant master device to remain online while it is programmed for bus mastership, thereby mitigating the risk of errors/damage due to slow handover and simplifies the PLC (Programmable Logic Controller) control loop.

Some parts of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources.

An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, and as illustrated in FIG. 2, the entire network interface module 220 may be implemented within the same integrated circuit device 205, and in the same integrated circuit device 205 as the application processor (CPU) 210 of the network device 200. Alternatively, the examples may be implemented as any number of separate integrated circuits or separate devices interconnected with each other in a suitable manner. For example, the network interface module 220 may be implemented within a separate device to, say, the application processor (CPU) 210 of the network device 200. Furthermore, the various components of the network interface module 220 may be distributed across multiple integrated circuit devices.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A network interface module arranged to transmit and receive data frames over a computer network; the network interface module comprising:
    at least one processor core arranged to execute a set of threads, the set of threads comprising at least one port servicing thread arranged to service requests received from at least one network port of the network interface module; and
    at least one task scheduling component arranged to schedule the execution of threads by the at least one processor core,
    wherein the network interface module is arranged to receive an indication that at least one network configuration parameter for the at least one network port is required to be changed, and upon receipt of such an indication to:
    mask the at least one port servicing thread from being executed by the at least one processor core; and
    enable the at least one network configuration parameter for the at least one network port to be changed while the at least one port servicing thread is masked, wherein the at least one network configuration parameter is changed without disabling the at least one network port, and wherein the at least one port servicing thread is unmasked and scheduled for execution after the change is complete.

2. The network interface module of claim 1, wherein the network interface module is arranged to wait until the at least one port servicing thread is inactive before enabling the at least one network configuration parameter for the at least one network port to be changed whilst the at least one port servicing thread is masked.

3. The network interface module of claim 1, wherein the network interface module is arranged to wait until a number of pending direct memory accesses for the at least one port servicing thread is equal to zero before enabling the at least one network configuration parameter for the at least one network port to be changed whilst the at least one port servicing thread is masked.

4. The network interface module of claim 1, wherein the at least one task scheduling component comprises a masked flag for the at least one port servicing thread, wherein the network interface module is arranged to set the masked flag to mask the at least one port servicing thread, whereby the at least one task scheduling component is prevented from scheduling the at least one port servicing thread for execution by the at least one processor core when the masked flag is set.

5. The network interface module of claim 1, wherein the network interface module is further arranged to:
    obtain a command vector for the received indication that the at least one network configuration parameter for the at least one network port is required to be changed; and
    generate a set of commands for changing the at least one network configuration parameter based at least partly on the received command vector.

6. The network interface module of claim 1, wherein the at least one task scheduling component is arranged to enable the at least one network configuration parameter for the at least one network port to be changed by scheduling a command thread for execution by the at least one processor core, the command thread being arranged to switch context to the at least one port servicing thread to implement the changes to the at least one network configuration parameter.

7. The network interface module of claim 1, wherein:
    the set of threads comprises at least one transmit thread arranged to service transmit requests received from the at least one network port and at least one receive thread arranged to service receive requests received from the at least one network port; and
    the network interface module is arranged to, upon receipt of an indication that the at least one network configuration parameter for the at least one network port is required to be changed:
    mask the at least one transmit thread and the at least one receive thread for the at least one network port; and
    enable the at least one network configuration parameter for the at least one network port to be changed whilst the at least one transmit thread and the at least one receive thread are masked.

8. The network interface module of claim 7, wherein the at least one task scheduling component comprises a direct memory access (DMA) from command flag for each of the at least one transmit thread and at least one receive thread; and when implementing the changes to the at least one network configuration parameter comprises performing at least one direct memory access, the network interface module is further arranged to set the DMA from the command flag for each of the at least one transmit thread and at least one receive thread, whereby the at least one task scheduling component is prevented from scheduling the at least one transmit thread and at least one receive thread for execution by the at least one processor core when their respective DMA from command flags are set.

9. The network interface module of claim 1, wherein the indication that the at least one network configuration parameter for the at least one network port is required to be changed comprises a command request signal configurable within a command register.

10. The network interface module of claim 9, wherein the network interface module is further arranged to clear the command request signal within the command register upon enabling the at least one network configuration parameter for the at least one network port to be changed.

11. The network interface module of claim 1 implemented within an integrated circuit device comprising at least one die within a single integrated circuit package.

12. A network device comprising at least one network interface module according to claim 1.

13. The network device of claim 12, wherein the network device comprises at least one command register comprising at least one command request bit cell configurable to indicate that at least one network configuration parameter for the at least one network port of the at least one network interface module is required to be changed.

14. The network device of claim 13, wherein the at least one command register further comprises at least one thread field for identifying at least one thread arranged to service requests received from a network port for which the at least one network configuration parameter is required to be changed.

15. The network device of claim 13, wherein the at least one command register further comprises at least one command vector field for storing at least one command vector from which a command or set of commands for changing the at least one network configuration parameter is able to be generated.

16. The network device of claim 13, wherein the network device comprises at least one application processor arranged to execute application program code for the network device; the application processor operably coupled to the at least one command register and capable of writing to at least one of:
the at least one command request bit cell;
at least one thread field; and
at least one command vector field.

17. A method of changing network configuration parameters on-the-fly within a network device, the method comprising:
receiving an indication from the network device that at least one network configuration parameter for a at least one network port is required to be changed;
masking at least one port servicing thread in response to receiving the indication to prevent the at least one port servicing thread from being executed; and
changing the at least one network configuration parameter for the at least one network port while the at least one port servicing thread is masked, wherein the at least one network configuration parameter is changed without disabling the at least one network port, and wherein the at least one port servicing thread is unmasked and scheduled for execution after the changing is complete.

18. The method of claim 17, wherein the method comprises waiting until the at least one port servicing thread is inactive before changing the at least one network configuration parameter for the at least one network port.

19. The method of claim 17, wherein the method comprises waiting until a number of pending direct memory accesses for the at least one port servicing thread is equal to zero before changing the at least one network configuration parameter for the at least one network port.

20. A method of performing a redundancy handover comprising changing at least one network configuration parameter in accordance with the method of claim 17.

* * * * *